(12) United States Patent
Keshwani et al.

(10) Patent No.: US 11,994,937 B2
(45) Date of Patent: May 28, 2024

(54) AUTOMATED RECOVERY MECHANISM FROM A SYSTEM CRASH

(71) Applicant: Dell Products L.P., Round Rock, TX (US)

(72) Inventors: Anup Keshwani, Bangalore (IN); Vishnu Ajit Kishore Reddy Koyya, Bangalore (IN); Nalapareddy Reddy Dheeraj Reddy, Bangalore (IN); Shuzhi Liu, Chaoyang (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/689,487

(22) Filed: Mar. 8, 2022

(65) Prior Publication Data

US 2023/0289253 A1  Sep. 14, 2023

(51) Int. Cl.
  *G06F 11/00* (2006.01)
  *G06F 11/07* (2006.01)

(52) U.S. Cl.
  CPC ......... *G06F 11/079* (2013.01); *G06F 11/073* (2013.01); *G06F 11/0793* (2013.01)

(58) Field of Classification Search
  CPC ... G06F 11/079; G06F 11/073; G06F 11/0793
  USPC ...................................................... 714/1–57
  See application file for complete search history.

(56) References Cited

U.S. PATENT DOCUMENTS

| | | | | |
|---|---|---|---|---|
| 7,516,367 B1* | 4/2009 | Beltowski | G06F 8/65 | 714/38.1 |
| 7,734,945 B1* | 6/2010 | Levidow | G06F 11/0793 | 714/3 |
| 8,479,051 B2* | 7/2013 | Yuan | G06F 11/0715 | 714/38.1 |
| 10,901,831 B1* | 1/2021 | Jain | G06F 11/0706 | |
| 11,093,321 B1 | 8/2021 | Zeavelou et al. | | |
| 2002/0120884 A1* | 8/2002 | Nakamikawa | G06F 11/1482 | 714/31 |
| 2003/0028825 A1* | 2/2003 | Hines | G06F 11/2294 | 714/37 |
| 2005/0044531 A1* | 2/2005 | Chawla | G06F 8/71 | 717/172 |
| 2006/0248177 A1* | 11/2006 | Dostert | G06F 11/3476 | 709/223 |
| 2007/0011497 A1* | 1/2007 | Walker | G06F 11/3636 | 714/45 |
| 2007/0106980 A1* | 5/2007 | Felts | G06F 9/44536 | 717/124 |
| 2008/0301502 A1* | 12/2008 | Harsha | G06F 11/366 | 714/37 |
| 2010/0011243 A1* | 1/2010 | Locasto | G06F 11/1438 | 714/E11.132 |
| 2011/0314343 A1* | 12/2011 | Hoke | G06F 11/3672 | 714/45 |
| 2012/0072776 A1* | 3/2012 | Ng | G06F 11/3688 | 714/38.12 |
| 2012/0144234 A1* | 6/2012 | Clark | G06F 11/142 | 714/16 |

(Continued)

*Primary Examiner* — Sarai E Butler
(74) *Attorney, Agent, or Firm* — Larson Newman, LLP

(57) ABSTRACT

In response to an operating system crash, a system may recovering by initiating a reboot and performing a dump of a core file for analysis which includes determining a root cause of the operating system crash and determining a patch for the root cause.

20 Claims, 4 Drawing Sheets

(56) References Cited

U.S. PATENT DOCUMENTS

| | | | | |
|---|---|---|---|---|
| 2015/0006963 A1* | 1/2015 | Geisert | ............... | G06F 11/0781 |
| | | | | 714/38.11 |
| 2015/0033082 A1* | 1/2015 | Shirlen | ............... | G06F 11/0724 |
| | | | | 710/306 |
| 2015/0347220 A1* | 12/2015 | Hermany | ............ | G06F 11/0775 |
| | | | | 714/48 |
| 2016/0110238 A1* | 4/2016 | Burugula | ............. | G06F 11/0787 |
| | | | | 714/38.11 |
| 2016/0292028 A1* | 10/2016 | Gamage | ................ | H04L 41/147 |
| 2016/0371149 A1* | 12/2016 | Antony | ............... | G06F 11/0778 |
| 2016/0378579 A1* | 12/2016 | Zhao | ................... | G06F 11/0748 |
| | | | | 714/37 |
| 2018/0322016 A1 | 11/2018 | Debata et al. | | |
| 2020/0104140 A1 | 4/2020 | Liu et al. | | |
| 2020/0218635 A1* | 7/2020 | Komanduri | ......... | G06F 11/3612 |
| 2020/0327004 A1* | 10/2020 | Ulman | .................... | G06F 16/00 |

\* cited by examiner

```
1   Function_1 ( ) {
2     char* q = "Test String";
3     while (A) {
4       char* x = malloc (_);
5       fgets (x, _);
6       if (A){
7         Use (x);
8         free (x);
9       }
10      else {
11        if (C) {
12          char* t = x;
13          x = q;
14          q = t;
15        }
16        Use (x);
17      }
18      print("while Loop");
19    }
20  }
21  Function_2 (char* x) {
22      printf ("%s", x);
23  }
24
25
```

AUTOMATED RECOVERY MECHANISM FROM A SYSTEM CRASH

FIELD OF THE DISCLOSURE

The present disclosure generally relates to information handling systems, and more particularly relates to an automated recovery mechanism from a system crash.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

In response to an operating system crash, a system may recovering by initiating a reboot and performing a dump of a core file for analysis which includes determining a root cause of the operating system crash and determining a patch for the root cause.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
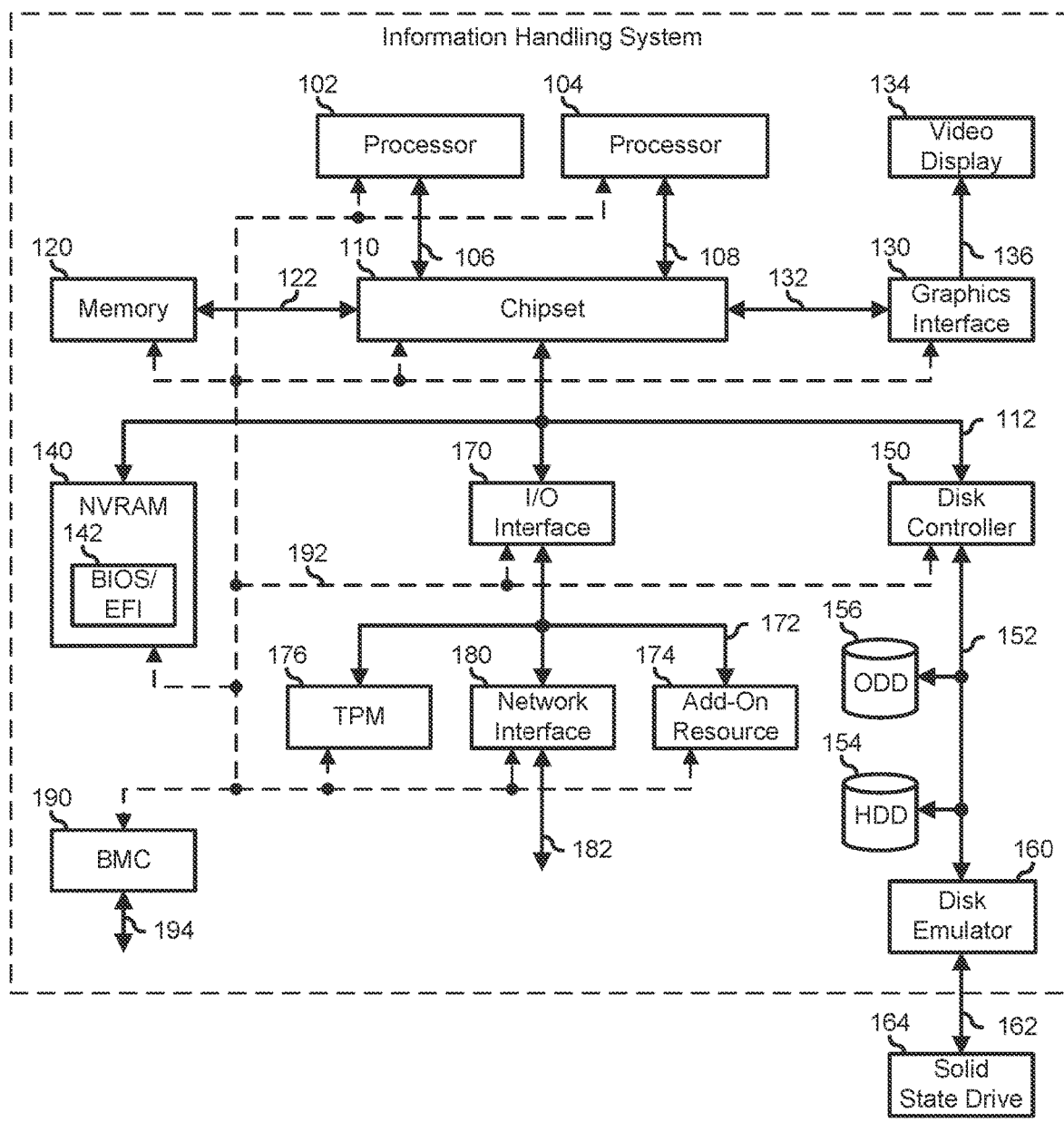
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth© or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Typically, a crash can occur when an operating system has reached a critical condition where it cannot operate safely. The system crash is also referred to as a catastrophic failure or a stop error. The system crash is also commonly referred to as a blue screen of death in Windows® systems and "kernel panic" for a system with a non-Windows operating system. The system crash occurs when an information handling system is unresponsive or "hangs". Generally when a system crashes, a user reaches out to someone in technical support to address the issue. The technical support specialist may suggest applying a patch to fix the cause of the system crash. At this point, the user generally downloads and installs an update package with the patch. However manually searching, downloading, and installing the update package is error-prone as well as time-consuming. At this point, the user has lost some productivity in addition to the machine's downtime which may have a potential impact on the user's goodwill.

Thus, there is a need for automatically recovering an information handling system from a system crash. In one embodiment, the present disclosure includes a system and method for automated recovery of the information handling system from an operating system crash. The recovery mechanism may be achieved by having a monitoring process that performs a system recovery.

Figure 2:
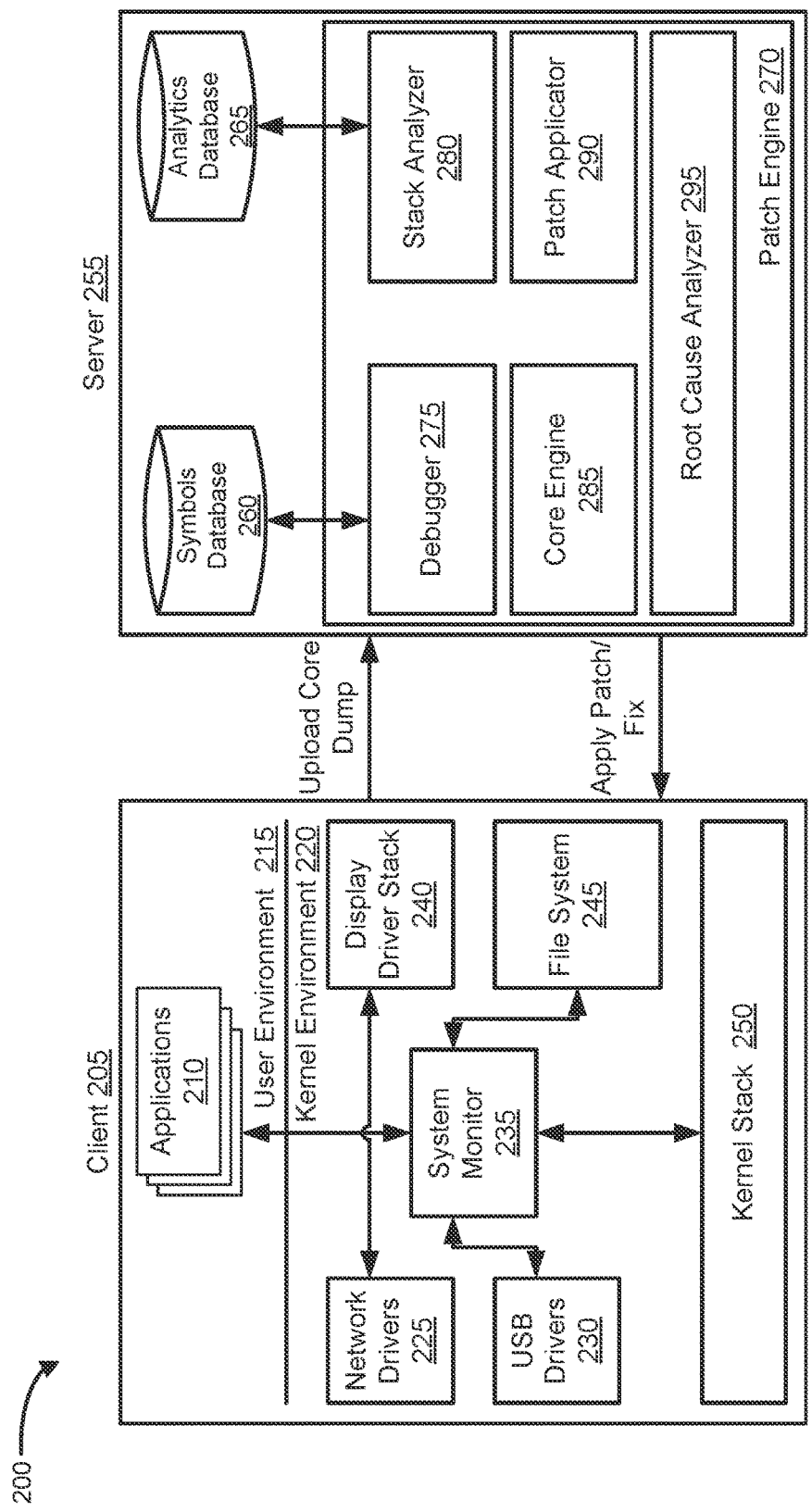
FIG. 2 is a block diagram illustrating an example of a mechanism for automated recovery from a system crash, according to an embodiment of the present disclosure.

FIG. 2 shows a system 200 for automatically recovering an information handling system from an operating system crash. System 200 includes a client 205 and a server 255 which are similar to information handling system 100 of FIG. 1. Client 205 includes a user environment 215 and a kernel environment 220. User environment 215 includes applications 210. Kernel environment 220 includes network drivers 225, USB drivers 230, a display driver stack 240, and a file system 245. Server 255 includes a symbols database 260, an analytics database 265, and a patch engine 270. Patch engine 270 includes a debugger 275, a stack analyzer 280, a core engine 285, a patch applicator 290, and a root cause analyzer 295.

The components of system 200 may be implemented in hardware, software, firmware, or any combination thereof. System 200 may not include each of the components shown in FIG. 2. Furthermore, some components that are represented as separate components in FIG. 2 may in certain embodiments instead are integrated with other components. For example, in certain embodiments, all or a portion of the functionality provided by the illustrated components may instead be provided by components integrated into one or more processor(s) as a system-on-a-chip. Also, the components shown are not drawn to scale and system 200 may include additional or fewer components. In addition, connections between components may be omitted for descriptive clarity. Additionally, or alternatively, system 200 may include various additional components in addition to those that are shown in FIG. 1.

Server 255 may be a standalone computing device or may be configured as an individual blade in a rack of several servers. Server 255 may be a management server that manages and/or monitors one or more clients such as client 205. Server 255 receives a core dump from system monitor 235 of client 205 when client 205 encounters an operating system crash and proceeds to perform recovery operations to fix the root cause of the system crash. Server 255 and client 205 may or may not be geographically co-located. For example, server 255 may be hosted in a cloud-based hosting service or located in the same data center.

Symbols database 260 and analytics database 265 may be in the same or different persistent data storage devices. The storage device may include a solid-state disk, hard disk drive, magnetic tape library, optical disk drive, magneto-optical disk drive, compact disk drive, compact disk array, disk array controller, and/or any computer-readable medium operable to store data.

Client 205 may be a desktop computer, a laptop computer, a tablet computer, a handheld device, a cellular phone, or any suitable information handling system. Client 205 and may communicate with server 255 through a network via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol, Remote Desktop Protocol (RDP), or any suitable protocol or combination of protocols. The network may be a public network, such as the Internet, a physical private network, a wireless network, a virtual private network (VPN), or any combination thereof.

Applications 210 include one or more computer programs designed to carry out a task in user environment 215 of client 205. Examples of applications include word processors, media players, etc. While kernel environment 220 of client 205 includes file system 245 which may include a fast file system (FFS) file, extensible file allocation tables (exFAT) file, a virtual file allocation table (vFAT) file, an international organization for standardization (ISO) file, etc. Kernel stack 250 includes stack traces associated with a boot loader, the CPU, the system memory, clock, thread management, etc.

Network drivers 225 may be used by client 205 to communicate with server 255. For example, system monitor 235 may upload files to server 255 using network drivers 225. Network drivers 225 may also be used by server 255 to communicate with client 205 to apply a patch or a fix for the system crash encountered by client 205. For example, system monitor 235 may perform a core dump to server 255 using network drivers 225. In another embodiment, if there is an issue with network drivers 225, system monitor 235 may perform the core dump by copying the information or files to a storage or memory device, such as a flash drive, using USB drivers 230.

System monitor 235, a monitoring process, may be configured to monitor client 205 and facilitate recovery from a system crash. The system monitor may be configured to periodically monitor one or more components of client 205 to detect an issue such as a system crash, stop error, or a trap. The trap may be an unexpected kernel mode trap error or something similar. For example, system monitor 235 may perform a sanity check based on a timer to determine if the operating system is functioning normally or has encountered a system crash, stop error, or trap. In another example, system monitor 235 may receive a signal when the system crash, stop error, or trap occurs. The signal or a sanity check failure may trigger a recovery mechanism to determine the root cause of the issue and apply a fix so that client 205 may recover. System monitor 235 may maintain control of client 205 during the recovery process or mechanism. The recovery mechanism may be triggered during reboot of client 205 after the occurrence of the system crash, stop error, or trap, wherein system monitor 235 may trigger or initiate the reboot.

The recovery mechanism includes system monitor 235 uploading information associated with the system crash, stop error, or trap. For example, system monitor 235 may upload a core file to server 255 also referred to as performing a crash or core dump. The core dump may be performed during the reboot unless client 205 has been bricked. The core file includes data on the state of the process at the instant the system crash occurred. For example, the core file may include contents of system memory or RAM at a particular moment in time. The core file may include information that tells which instruction was executing at the time the core dump was initiated. In one embodiment, the uploaded information may include kernel stack 250, file system 245, and display driver stack 240. In addition, the uploaded information may include stack trace associated with applications 210.

Core engine 285 may be configured to load one or more symbols file from symbols database 260. Symbols database 260 includes different types of symbols to be used in debugging the information received from client 205. For example, symbols database 260 includes program debug database (PDB) files. Core engine 285 may provide the information received from client 205 to debugger 275. Debugger 275 includes a set of debugging tools that may include GNU™ debugger (GDB), Windows Debugger (WinDbg), low-level debugger (LLDB), etc. that may be used in analyzing the information. Core engine 285 may determine the type of debugger to use based on the type of the core file. For example, core engine 285 may determine to use WinDbg for the core dump of the information handling system with a Windows operating system or GDB for the information handling system with a Linux® operating system. Core engine 285 may also be configured to generate a patch to fix the issue. Core engine 285 may receive the root cause from root cause analyzer 295 and based on the root cause to determine the patch or fix.

Stack analyzer 280 may be configured to analyze the stack using one of the debugging tools in debugger 275. For example, stack analyzer 280 may determine the type of system crash. Types of system crashes include segmentation fault, data abort, instruction pointers, etc. Stack analyzer 280 may capture a backtrace by walking up the stack from the uploaded core file from client 205 and recording information for each frame. The backtrace may include a list of function calls and information on how a program or operating system got where it is. For example, the backtrace may show a frame number and a function name in each line. In addition, the backtrace may show the source file name as well as the arguments to the function. Stack analyzer 280 may also be configured to determine the faulty stack and check registers, stack pointers, instruction pointers, etc. The analysis may be based on the type of the system crash. For example, if the type of the system crash is a memory leak, then a control flow graph similar to a graph 420 of FIG. 4 to determine the leaky path. If the type of the system crash is a segmentation fault, then Based on the analysis by stack analyzer 280, a root cause of the system crash may be determined by root cause analyzer 295. Typical root causes of system crashes include memory issues such as memory leaks and out-of heap issues. Other root causes include segmentation faults, corrupted registry files, etc. For example, root cause analyzer 295 may determine that a block of memory that has been previously allocated has not been deallocated. Patch applicator 290 may apply and test the fix or patch to a source code if applicable. Patch applicator 290 may transmit the patch or fix to client 205 via an update package. System monitor 235 may receive and install the update package. In addition, the fix or patch may be stored in analytics database 265 for future use or further review/validation by a member of the engineering team. Also, system monitor 235 may continue monitoring the information handling system to detect a next operating system crash.

Those of ordinary skill in the art will appreciate that the configuration, hardware, and/or software components of system 200 depicted in FIG. 2 may vary. For example, the illustrative components within system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
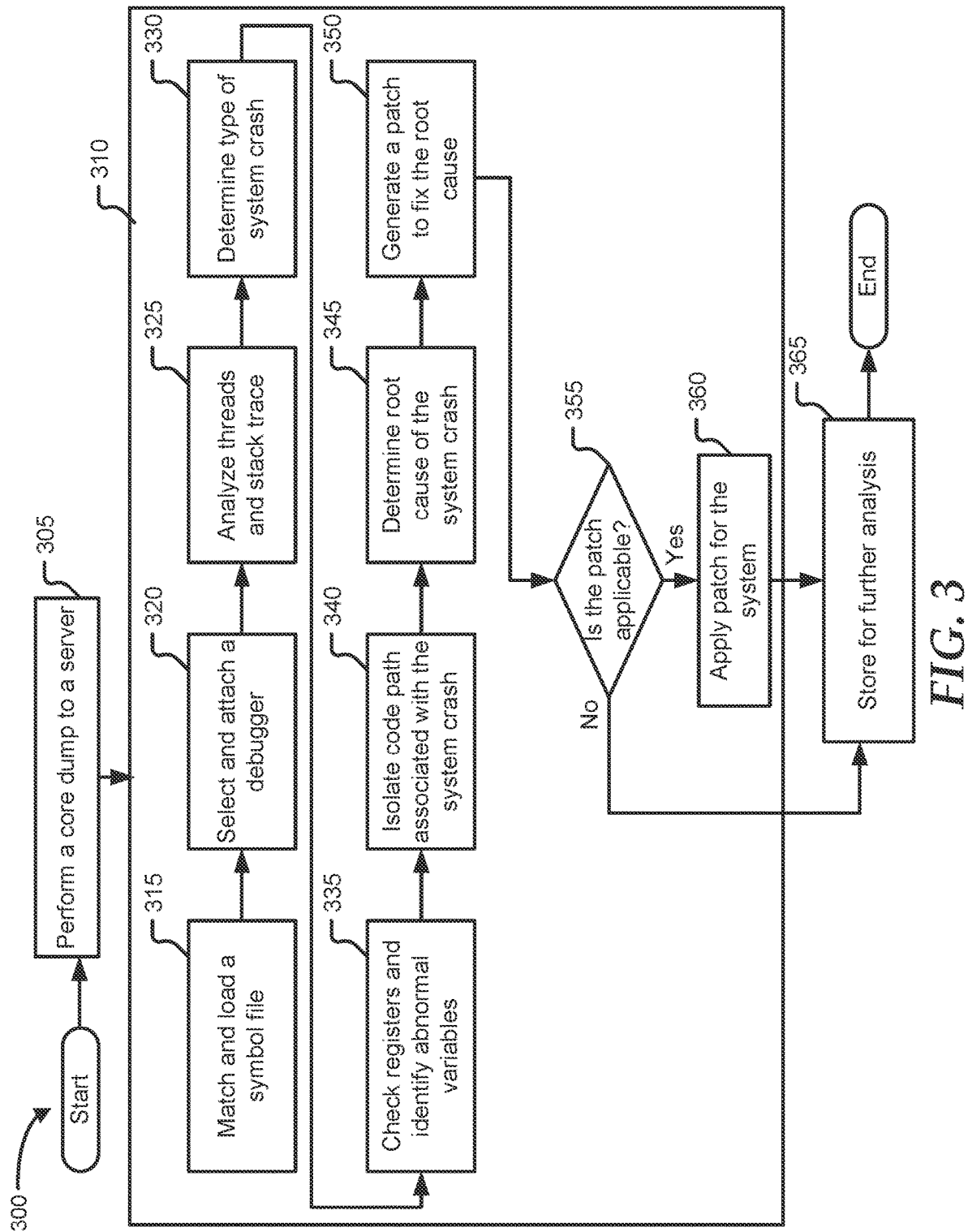
FIG. 3 is a flowchart illustrating an example of a method for automated recovery from a system crash, according to an embodiment of the present disclosure.

FIG. 3 illustrates a method 300 for automatically determining a root cause and patching an issue that caused an information handling system to crash. Method 300 may be performed by one or more components of system 200 of FIG. 2. For example, block 305 may be performed by system monitor 235 while block 310 and block 365 is performed by a component(s) of server 255. In particular, block 310 may be performed by patch engine 270. While embodiments of the present disclosure are described in terms of system 200 of FIG. 2, it should be recognized that other systems may be utilized to perform the described method. One of skill in the art will appreciate that this flowchart explains a typical example, which can be extended to advanced applications or services in practice.

Method 300 typically starts at block 305 where a core dump of a client is uploaded to a server. After performing the upload, the method performs block 310 which analyzes and fixes the issue that caused the system crash. Block 310 includes one or more blocks and typically starts at block 315, where the method matches and loads a symbol file based on the core dump. For example, the method may match the version and operating system associated with the core dump with a symbol file. The symbol file will be used for debugging and includes variable names, functions, and other symbols that are useful during the debugging process. At block 320, the method selects a debugging tool to be used in debugging the core dump and attaches the core dump to the debugging tool. The method may match the operating system associated with the core dump with a debugging tool. For example, if the core dump is from a Windows client then the method may select WinDbg as the debugging tool. Blocks 310 and 320 may be performed by core engine 285 of FIG. 2.

At block 325, the method analyzes the threads and the stack trace. For example, the method may inspect allocated heap data blocks by performing a heap walk. The method may retrieve the allocated data code information by getting the allocated and deallocated counts associated with the source code and maintaining information associated with allocation pointers. Based on the aforementioned, the method may identify a leaky allocation, such as there are more allocated counts than deallocated counts. At block 330, the method determines the type of the operating system crash. For example, the method may parse the trap summary included in the information received, wherein the trap summary may indicate the type of the system crash. Blocks 325 and 330 may be performed by stack analyzer 280 using debugger 275 of FIG. 2.

At block 335, the method check registers and determines if there is an abnormal variable, and identifies the abnormal variable such as an un-initialized or undefined variable. At block 340, the method isolates a code path associated with the system crash. For example, the method may build a control flow graph similar to graph 420 of FIG. 4 after identifying the leaky allocation. The method may identify a leaky path based on the control flow graph. For example, the method determines if there are reachable free nodes from the source node. The method may traverse the leaky path to determine the location where the allocation pointer was last used and inject a deallocation fix. Blocks 335, and 340 may be performed by stack analyzer 280 of FIG. 2.

At block 345, the method determines the root cause of the system crash and transmits information associated with the root cause to the core engine, such as core engine 285 of FIG. 2. For example, the method may track a leaky path by instrumenting and tracking memory accesses. An instruction pointer may also point to a faulty instruction or code that caused the system crash. In another example, a null pointer segmentation fault may point to the line that caused the null pointer error. The method may locate the line of code associated with the segmentation fault and fetch a variable with a value of NULL. The method may perform the analysis using a hash map to determine the condition or code path. The method may traverse the code path and apply the patch accordingly. At block 350, the method may generate and test a patch to fix the root cause. For example, the method may generate a conditional check, a line to deallocate memory, initialize a variable, etc., wherein the generated patch may be applied at block 360. Block 345 may be performed by root cause analyzer 295 of FIG. 2, wherein after determining the root cause, information associated with the root cause may be transmitted to the core engine which generates the patch based on the root cause and/or other information received such as the line number associated with the root cause.

At decision block 355, the method determines whether the patch is applicable. The determination may be based on the result of the test performed at block 350. If the patch is applicable, then the "YES" branch is taken and the method proceeds to block 360. If the patch is not applicable, then the "NO" branch is taken and the method proceeds to block 365. The patch may not be applicable if it failed the test. The patch may also not be applicable for issues associated with source code that is not accessible to the method. For example, because Windows operating system is a secured source code, the method may identify the root cause but cannot apply the patch because it does not have access to the source code. The patch engine may file or trigger an application for a bug with the developer of the operating system.

For example, the patch engine may send an email to the engineering team and include information associated with the issue and/or the fix.

At block 360, the method applies the patch, such as inserting the fix to an appropriate location in the source code at the information handling system, such as via an update. For example, the method may add conditional checks to avoid executing a code segment that leads to the system crash. In another example, memory leaks may be repaired by deallocating a memory that was earlier allocated but not released, such as by inserting a patch 410 which could be a deallocation fix. The deallocation fix may be a free call at a line identified by an arrow at a source code 405 of FIG. 4, which is after a use call. In another example, for segmentation faults, a fix is to dereference a NULL pointer or to dereference an uninitialized pointer. If the root cause of the segmentation fault is an uninitialized pointer, the method initializes the pointer.

At block 365, the information associated with the system crash is stored for further analysis. The information stored may include the core dump, the patch, and/or other information such as a control flow graph, analysis results, etc. The information may be stored in a database, files, blocks, or another suitable format. Decision block 355 and block 360 may be performed by patch applicator 290 of FIG. 2.

Figure 4:
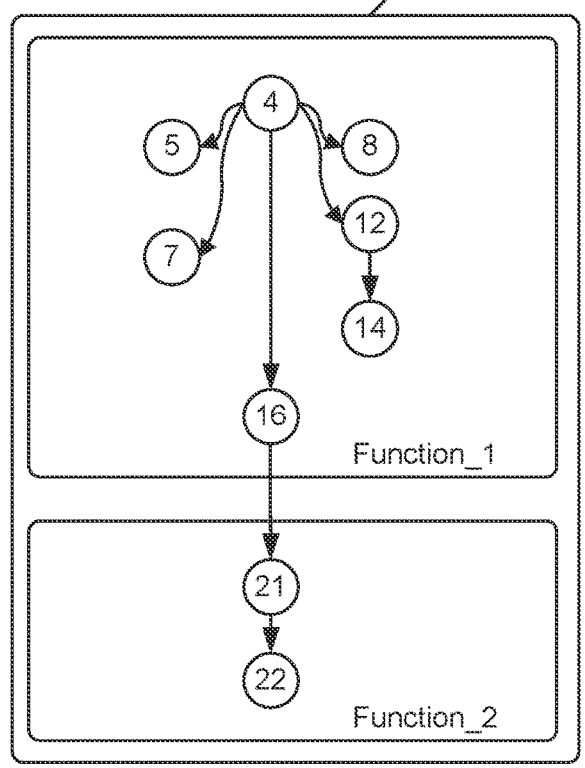
FIG. 4 is a diagram illustrating an example of a part of a recovery mechanism used in analyzing a core file for automated recovery, according to an embodiment of the present disclosure.

FIG. 4 shows an example 400 of an analysis performed to a source code. Example 400 includes source code 405 and graph 420 that is based on source code 405. Patch 410 includes a free call such as "free(x)" to be inserted at the location indicated by the arrow. The fix may be the result of the analysis of the control flow graph which identified a leaky path at line 16 of source code 405.

Although FIG. 3 shows example blocks of method 300 in some implementation, method 300 may include additional blocks, fewer blocks, different blocks, or differently arranged blocks than those depicted in FIG. 3. Those skilled in the art will understand that the principles presented herein may be implemented in any suitably arranged processing system. Additionally, or alternatively, two or more of the blocks of method 300 may be performed in parallel. For example, blocks 315 and 320 of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
    monitoring, by a processor, an information handling system to detect an operating system crash; and
    in response to detecting the operating system crash, recovering the information handling system, including:
        initiating a reboot of the information handling system;
        performing a dump of a core file for analysis during the reboot, wherein the analysis of the core file includes automatically isolating a code path associated with the operating system crash and determining a root cause of the operating system crash and generating a patch for the root cause based on a line number of source code associated with the root cause; and
        automatically applying the patch by inserting the patch to the source code.

2. The method of claim 1, wherein the recovering further includes testing the patch before applying the patch.

3. The method of claim 1, wherein the recovering further includes storing the patch at a storage device for review.

4. The method of claim 1, wherein the recovering further includes determining an operating system crash type.

5. The method of claim 1, further comprising subsequent to the applying the patch, monitoring the information handling system to detect a next operating system crash.

6. An information handling system, comprising:
a processor;
a memory storing instructions that when executed causes the processor to:
monitor the information handling system to detect an operating system crash;
in response to detection of the operating system crash, recovering the information handling system including:
initiating a reboot of the information handling system and performing a dump of a core file for analysis which includes automatically isolating a code path associated with the operating system crash, determining a debugger for the analysis, determining a root cause of the operating system crash using the debugger, and generating a patch for the root cause based on a line number of source code associated with the root cause; and
automatically applying the patch by inserting the patch to the source code.

7. The information handling system of claim 6, wherein the processor is further configured to monitor the information handling system to detect a next operating system crash after the patch is applied.

8. The information handling system of claim 6, wherein the recovering includes testing the patch.

9. A method comprising:
receiving core file associated with an operating system crash;
attaching the core file to a debugging tool;
analyzing the core file using the debugging tool to automatically isolate a code path associated with the operating system crash and to determine a root cause of the operating system crash;
generating a patch to fix the root cause based on a line number of source code associated with the root cause; and
automatically applying the patch by inserting the patch to the source code.

10. The method of claim 9, further comprising uploading the core file and the patch to a persistent storage device.

11. The method of claim 9, further comprising selecting the debugging tool based on the core file.

12. The method of claim 9, further comprising testing the patch.

13. The method of claim 9, wherein the core file is received from a monitoring process.

14. The method of claim 9, further comprising loading a symbols file.

15. The method of claim 9, further comprising determining a type of the operating system crash.

16. The method of claim 9, further comprising performing a backtrace.

17. The method of claim 9, further comprising determining a faulty stack.

18. The method of claim 9, further comprising checking registers in the core file.

19. The method of claim 9, further comprising checking stack pointers in the core file.

20. The method of claim 9, further comprising checking instruction pointers in the core file.

* * * * *